(12) United States Patent
Pasternak (10) Patent No.: US 9,256,488 B2
(45) Date of Patent: Feb. 9, 2016

(54) VERIFICATION OF TEMPLATE INTEGRITY OF MONITORING TEMPLATES USED FOR CUSTOMIZED MONITORING OF SYSTEM ACTIVITIES

(75) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 947 days.

(21) Appl. No.: 12/898,526

(22) Filed: Oct. 5, 2010

(65) Prior Publication Data

US 2012/0084608 A1     Apr. 5, 2012

(51) Int. Cl.
- *G06F 11/07* (2006.01)
- *G06F 21/54* (2013.01)
- *G06F 21/64* (2013.01)

(52) U.S. Cl.
CPC ............ *G06F 11/0751* (2013.01); *G06F 21/54* (2013.01); *G06F 21/64* (2013.01)

(58) Field of Classification Search
USPC ............................................ 714/41; 709/224
See application file for complete search history.

(56) References Cited

U.S. PATENT DOCUMENTS

| | | | |
|---|---|---|---|
| 4,764,863 A * | 8/1988 | Silverthorn et al. ............ | 714/39 |
| 5,793,753 A | 8/1998 | Hershey et al. | |
| 5,974,237 A | 10/1999 | Shurmer et al. | |
| 6,085,243 A | 7/2000 | Fletcher et al. | |
| 6,093,215 A * | 7/2000 | Buxton et al. ................. | 717/107 |
| 6,131,162 A * | 10/2000 | Yoshiura et al. ............... | 713/176 |
| 6,282,712 B1 | 8/2001 | Davis et al. | |
| 6,499,105 B1 * | 12/2002 | Yoshiura et al. ............... | 713/176 |
| 6,799,147 B1 | 9/2004 | Balasubramanian et al. | |
| 6,918,038 B1 * | 7/2005 | Smith et al. ...................... | 726/22 |
| 6,925,085 B1 * | 8/2005 | Krishna et al. ........... | 370/395.32 |
| 7,000,150 B1 | 2/2006 | Zunino et al. | |
| 7,162,638 B2 * | 1/2007 | Yoshihiro ...................... | 713/179 |
| 7,171,021 B2 * | 1/2007 | Yoshida et al. ............... | 382/100 |
| 7,246,156 B2 | 7/2007 | Ginter et al. | |

(Continued)

FOREIGN PATENT DOCUMENTS

WO    WO 2010020101 A1 *    2/2010    .............. H04L 29/06

OTHER PUBLICATIONS

Tulloch, Mitch, et al., "Tip: Use Windows PowerShell to Monitor System Performance", retrieved May 12, 2010 from TechNet Magazine http://technet.microsoft.com/en-us/magazine/ee872428.aspx, 1 page, excerpt from Windows 7 Resource Kit, published Oct. 7, 2009, Microsoft Corporation.

(Continued)

*Primary Examiner* — Loan L. T. Truong
(74) *Attorney, Agent, or Firm* — Lowenstein Sandler LLP (57) ABSTRACT

A mechanism for performing verification of template integrity of monitoring templates used for customized monitoring of system activities. A method of embodiments of the invention includes calculating a first hash code for a monitoring template, the monitoring template to customize a performance monitor to serve as a universal monitor to facilitate a plurality of monitoring tools to perform monitoring of activities of a plurality of system components of the computer system, extracting the first hash code from the monitoring template, and calculating a second hash code for the monitoring template. The method further includes verifying integrity of the monitoring template by comparing the first hash code with the second hash code, and the integrity of the monitoring template is determined to be satisfactory if the first hash code matches the second hash code.

18 Claims, 6 Drawing Sheets

(56) References Cited

U.S. PATENT DOCUMENTS

| | | | |
|---|---|---|---|
| 7,299,277 | B1 | 11/2007 | Moran et al. |
| 7,313,248 | B2* | 12/2007 | Tonisson ............... G06T 1/0028 382/100 |
| 7,398,307 | B2 | 7/2008 | Dorland |
| 7,523,191 | B1* | 4/2009 | Thomas .............. G06F 11/3438 709/202 |
| 7,747,738 | B2 | 6/2010 | Ellisor, Jr. |
| 7,779,119 | B2 | 8/2010 | Ginter et al. |
| 7,865,764 | B2 | 1/2011 | Jester |
| 7,904,472 | B1* | 3/2011 | Karnik .............. G06F 17/30306 707/779 |
| 7,975,045 | B2 | 7/2011 | Underwood |
| 8,000,345 | B2 | 8/2011 | Blackford et al. |
| 8,024,459 | B2 | 9/2011 | Robbins et al. |
| 8,103,762 | B2 | 1/2012 | Duberry |
| 8,145,742 | B1 | 3/2012 | Parker et al. |
| 8,185,651 | B2 | 5/2012 | Moran et al. |
| 8,190,903 | B2* | 5/2012 | Nayak .................. G06F 21/645 713/176 |
| 8,219,663 | B2 | 7/2012 | Faraldo, II |
| 8,239,709 | B2 | 8/2012 | Hom et al. |
| 8,254,698 | B2* | 8/2012 | Kantor et al. ................. 382/209 |
| 8,321,863 | B2 | 11/2012 | Yamaguchi et al. |
| 8,332,509 | B2 | 12/2012 | Robertson et al. |
| 8,413,144 | B1 | 4/2013 | Manmohan et al. |
| 8,527,982 | B1 | 9/2013 | Sapuntzakis et al. |
| 8,582,567 | B2* | 11/2013 | Kurapati et al. ................ 370/356 |
| 2001/0034839 | A1* | 10/2001 | Karjoth et al. ................ 713/190 |
| 2002/0059327 | A1* | 5/2002 | Starkey ......................... 707/203 |
| 2002/0099946 | A1* | 7/2002 | Herbert ............... G06F 12/1408 713/193 |
| 2002/0107958 | A1 | 8/2002 | Faraldo, II |
| 2002/0146123 | A1* | 10/2002 | Tian .............................. 380/234 |
| 2002/0162059 | A1 | 10/2002 | McNeely et al. |
| 2002/0165954 | A1 | 11/2002 | Eshghi et al. |
| 2003/0023963 | A1 | 1/2003 | Birkholz et al. |
| 2003/0233366 | A1 | 12/2003 | Kesselman et al. |
| 2004/0153825 | A1* | 8/2004 | Morimoto ........... G06F 11/3624 714/38.13 |
| 2005/0086195 | A1 | 4/2005 | Tan et al. |
| 2005/0160045 | A1* | 7/2005 | Watanabe et al. ................ 705/51 |
| 2005/0182969 | A1 | 8/2005 | Ginter et al. |
| 2005/0216830 | A1* | 9/2005 | Turner et al. ................... 715/513 |
| 2005/0256893 | A1* | 11/2005 | Perry ............................. 707/101 |
| 2006/0005088 | A1 | 1/2006 | Zeng et al. |
| 2006/0041561 | A1* | 2/2006 | Singer ................ H04L 63/0823 |
| 2006/0064486 | A1 | 3/2006 | Baron et al. |
| 2006/0085543 | A1 | 4/2006 | Hrastar et al. |
| 2006/0085790 | A1 | 4/2006 | Hintermeister et al. |
| 2006/0112175 | A1* | 5/2006 | Sellers et al. ................. 709/223 |
| 2006/0123133 | A1 | 6/2006 | Hrastar |
| 2006/0178918 | A1* | 8/2006 | Mikurak ........................... 705/7 |
| 2006/0179058 | A1* | 8/2006 | Bram et al. ........................ 707/9 |
| 2006/0179432 | A1 | 8/2006 | Walinga et al. |
| 2006/0195886 | A1* | 8/2006 | Ashley ............................ 725/138 |
| 2006/0218364 | A1 | 9/2006 | Kitamura |
| 2006/0265625 | A1* | 11/2006 | Dubois et al. ...................... 714/6 |
| 2007/0016429 | A1* | 1/2007 | Bournas et al. ................... 705/1 |
| 2007/0094367 | A1 | 4/2007 | Esfahany et al. |
| 2007/0136024 | A1 | 6/2007 | Moser et al. |
| 2007/0143338 | A1 | 6/2007 | Wang et al. |
| 2007/0294369 | A1 | 12/2007 | Ginter et al. |
| 2008/0028370 | A1* | 1/2008 | Lewallen et al. ............. 717/128 |
| 2008/0098454 | A1 | 4/2008 | Toh |
| 2008/0134340 | A1* | 6/2008 | Ueda et al. ..................... 726/26 |
| 2008/0189546 | A1* | 8/2008 | Yoon ............................. 713/168 |
| 2008/0208806 | A1 | 8/2008 | Dalfo et al. |
| 2008/0209033 | A1 | 8/2008 | Ginter et al. |
| 2008/0222414 | A1* | 9/2008 | Wang .................... H04L 9/0643 713/161 |
| 2008/0260147 | A1* | 10/2008 | Shin ...................... H04L 9/0634 380/46 |
| 2008/0275973 | A1 | 11/2008 | Toeroe |
| 2008/0301803 | A1* | 12/2008 | Ontaneda et al. ............... 726/17 |
| 2009/0024994 | A1 | 1/2009 | Kannan et al. |
| 2009/0077383 | A1* | 3/2009 | de Monseignat ... H04L 63/0823 713/175 |
| 2009/0193497 | A1* | 7/2009 | Kikuchi ................. G06F 21/54 726/1 |
| 2009/0199012 | A1* | 8/2009 | Yamada et al. ................ 713/176 |
| 2009/0199047 | A1 | 8/2009 | Vaitheeswaran et al. |
| 2009/0265707 | A1 | 10/2009 | Goodman et al. |
| 2009/0271504 | A1 | 10/2009 | Ginter et al. |
| 2009/0288084 | A1 | 11/2009 | Astete et al. |
| 2009/0328143 | A1* | 12/2009 | Ming .................... G06T 1/0028 726/2 |
| 2010/0023598 | A9 | 1/2010 | Ginter et al. |
| 2010/0064039 | A9 | 3/2010 | Ginter et al. |
| 2010/0094981 | A1* | 4/2010 | Cordray et al. ............... 709/222 |
| 2010/0125844 | A1 | 5/2010 | Mousseau et al. |
| 2010/0131638 | A1 | 5/2010 | Kondamuru |
| 2010/0131769 | A1* | 5/2010 | Homma ......................... 713/176 |
| 2010/0198875 | A1* | 8/2010 | Rieger et al. .................. 707/793 |
| 2010/0268957 | A1* | 10/2010 | Suzuki et al. ................. 713/176 |
| 2010/0310132 | A1* | 12/2010 | Perez Gonzalez ... G06K 9/4642 382/112 |
| 2010/0322252 | A1 | 12/2010 | Suganthi et al. |
| 2010/0333172 | A1* | 12/2010 | Jiang ................................ 726/1 |
| 2011/0145217 | A1 | 6/2011 | Maunder et al. |
| 2011/0191351 | A1* | 8/2011 | Chao et al. ..................... 707/748 |
| 2011/0209160 | A1 | 8/2011 | Venkatachalam |
| 2011/0238792 | A1 | 9/2011 | Phillips et al. |
| 2011/0302651 | A1* | 12/2011 | Bates et al. ..................... 726/22 |
| 2012/0011408 | A1 | 1/2012 | Swamy et al. |
| 2012/0047194 | A1* | 2/2012 | Stergiou et al. ............... 708/700 |
| 2012/0084413 | A1* | 4/2012 | Pasternak ....................... 709/221 |
| 2012/0084436 | A1* | 4/2012 | Pasternak ....................... 709/224 |
| 2012/0084608 | A1* | 4/2012 | Pasternak ......................... 714/41 |
| 2012/0084780 | A1* | 4/2012 | Pasternak ....................... 718/100 |

OTHER PUBLICATIONS

USPTO, Office Action for U.S. Appl. No. 12/898,480 mailed on Jun. 20, 2012.
USPTO, Final Office Action for U.S. Appl. No. 12/898,480 mailed on Jan. 3, 2013.
USPTO, Advisory Action for U.S. Appl. No. 12/898,480 mailed Mar. 14, 2013.
USPTO, Office Action for U.S. Appl. No. 12/898,582 mailed Jan. 18, 2013.
USPTO, Office Action for U.S. Appl. No. 12/898,428 mailed Mar. 28, 2013.
Managing Network Monitor from the command line; Updated on Jan. 21, 2005; Microsoft; http://technet.microsoft.com/en-us/library/cc782726(v=ws.10).aspx.
USPTO, Office Action for U.S. Appl. No. 12/898,582 mailed Oct. 11, 2013.
USPTO, Office Action for U.S. Appl. No. 12/898,428 mailed Oct. 18, 2013.
USPTO, Office Action for U.S. Appl. No. 12/898,480 mailed on Apr. 24, 2014.
USPTO, Final Office Action for U.S. Appl. No. 12/898,480 mailed on Nov. 17, 2014.
USPTO, Advisory Action for U.S. Appl. No. 12/898,480 mailed Feb. 19, 2015.
USPTO, Office Action for U.S. Appl. No. 12/898,480 mailed on May 6, 2015.
USPTO, Office Action for U.S. Appl. No. 12/898,582 mailed Apr. 30, 2015.
USPTO, Notice of Allowance for U.S. Appl. No. 12/898,428 mailed Apr. 16, 2015.

* cited by examiner

FIG. 6

VERIFICATION OF TEMPLATE INTEGRITY OF MONITORING TEMPLATES USED FOR CUSTOMIZED MONITORING OF SYSTEM ACTIVITIES

RELATED APPLICATIONS

The present application is related to co-filed U.S. patent application Ser. No. 12/898,480, entitled "Mechanism for Customized Monitoring of System Activities", U.S. patent application Ser. No. 12/898,582, entitled "Mechanism for Installing Monitoring Activities Utilities Using Universal Performance Monitor", and U.S. patent application Ser. No. 13/028,109, entitled "Mechanism for Accessing and Processing Monitoring Data Resulting From Customized Monitoring of System Activities", which are assigned to the assignee of the present application.

TECHNICAL FILED

The embodiments of the invention relate generally to system monitoring and, more specifically, relate to performing verification of template integrity of monitoring templates used for customized monitoring of system activities.

BACKGROUND

Monitoring tools are commonly available for monitoring system resources. However, a monitoring tool is limited to monitoring a specific resource (e.g., memory capacity) of a computer system. With each monitoring tool being predetermined and specific to a particular system resource and its activities, the process of system monitoring turns to be much more complicated, and even unmanageable, when activities relating to a great number of system resources require monitoring, and to make matters worse, activities of certain system components remain unmonitored due to not having a particular monitoring tool that can monitor those system components. For example, depending on a system, a user (e.g., system administrator) may have to use three different monitoring tools to monitor three different component-related activities (e.g., virtual machine speed, central processing unit (CPU) capacity, and memory capacity) and yet not have a monitoring tool to monitor network speed. Furthermore, these monitoring tools are inflexible in their monitoring tasks because their behavior, performance, assigned system component, etc., are rigidly predefined and unchangeable. In addition, the integrity of such monitoring tools is assumed and not verified and thus, it carries the potential of causing severe problems if, for example, a corrupt monitoring tool is loaded and/or used.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for performing verification of template integrity of monitoring templates used for customized monitoring of system activities. A method of embodiments of the invention includes calculating a first hash code for a monitoring template, the monitoring template to customize a performance monitor to serve as a universal monitor to facilitate a plurality of monitoring tools to perform monitoring of activities of a plurality of system components of the computer system, extracting the first hash code from the monitoring template, and calculating a second hash code for the monitoring template. The method further includes verifying integrity of the monitoring template by comparing the first hash code with the second hash code, and the integrity of the monitoring template is determined to be satisfactory if the first hash code matches the second hash code.

The embodiments of the present invention are used for monitoring of system activities associated with various system components using a performance monitor. In one embodiment, the performance monitor provides the ability to generate monitoring templates to customize monitoring of the system activities. The customization of these monitoring templates includes having the performance monitor serve as a single universal monitoring tool and the ability to generate a monitoring template for even a non-exiting monitoring tool. In one embodiment, each monitoring template's integrity is verified prior to being loaded or used for performing its assigned monitoring tasks. Since, using template integrity component, every single monitoring template has to pass this integrity verification test prior to loading, a user can trust the integrity of any monitoring template that is loaded and/or being executed. Further, since, using the template synchronization component, each monitoring template (such as its configuration) is saved at and synchronized through a defined repository (e.g., template version repository), each monitoring template's integrity can be trusted even if a monitoring template is used at a different machine than where it was created or previously loaded and/or used. Moreover, from a security point of view, template integrity and its verification blocks unauthorized template modifications, which helps prevent situations like causing template components to be invoked on a remote machine if someone intentionally changed a utility (that is to be executed), such as names or arguments to script what might cause security breach.

Figure 1:
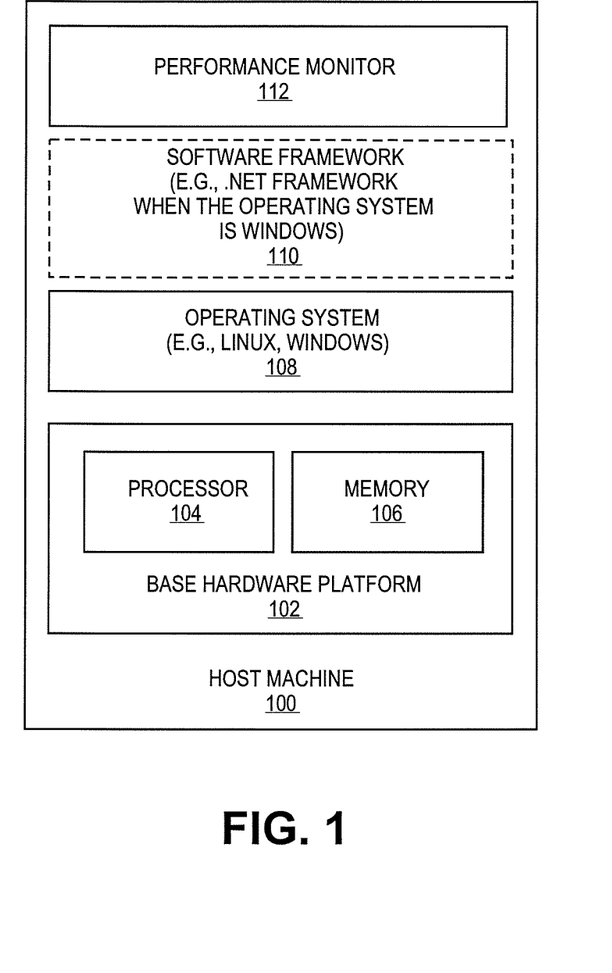
FIG. 1 is a block diagram of a host machine for employing a performance monitor for monitoring system activities according to one embodiment of the invention.

FIG. 1 is a block diagram of a host machine 100 for employing a performance monitor 112 for monitoring system activities according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and the user. In some embodiments, base hardware platform 102 may include a processor 104, memory devices 106, network devices, drivers, and so on. Throughout this document, for brevity and simplicity, Microsoft® Windows® and Linux® are used as examples of an operating system 108 that is capable of employing, supporting, and using a performance monitor 112. It is contemplated that performance monitor 112 is compatible with other operating systems. As illustrated here with reference to Windows and Linux, performance monitor 112 is compatible with components that are particular to an operating system 108, such as the well known Microsoft .NET® Framework is employed as a software framework 110 when the operating system 108 is Microsoft Windows, but it is not required when the operating system 108 is Linux. The terms "computer system" and "machine" are used interchangeably throughout this document.

Performance monitor 112 is a customizable monitoring tool that a user (e.g., system administrator, software developer) can customize and use to monitor various system activities as desired or necessitated. Performance monitor 112 represents a monitoring tool to provide a unique ability to monitor any type and/or number of system entities and their activities (e.g., physical machine activities, virtual machine activities). Further, the results of these system activities are directed to any location as specified in the relevant monitoring template, which may be different from a location specified in another monitoring template, or a single location may be specified within the configuration of performance monitor 112 (as opposed to in each monitoring template).

In one embodiment, performance monitor 112 provides monitoring templates that are capable of being customized to enable the performance monitor 112 to perform system monitoring tasks and other relevant functions in the manner as described in each monitoring template. This customization of the performance monitor 112 includes the ability to consolidate any number of monitoring tools so that the performance monitor 112 can serve as a single universal monitor. For example, instead of using three monitoring tools to monitor three different entities (e.g., virtual machine, memory, processor, etc.), a performance monitor template can be created and executed to have the performance monitor 112 act as a universal monitor (using the three monitoring tools) to monitor all three such entities. Although, as in this case, the three existing monitoring tools may still be used (by the performance monitor 112) to perform their respective monitoring tasks, the user has to handle only the universal monitor, i.e., the performance monitor 112. Similarly, performance monitor 112 can be customized to be used to monitor multiple activities (e.g., speed, capacity, etc.) of a single system entity (e.g., processor) or a single (e.g., speed) or multiple activities (e.g., speed, capacity) of multiple system entities (e.g., virtual machine, processor, etc.). Moreover, a monitoring template may be customized to create a new monitoring tool (as opposed to using an existing monitoring tool) that may not even be provided or supported by the operating system 108 to monitor a new system component, a new type of activity of an existing component, or in a new manner, etc. In one embodiment, a verification of template integrity of monitoring templates is provided. These monitoring templates are used for facilitating a performance monitor to serve as a universal monitor to perform customized monitoring of system activities of a computer system, such as host machine 100.

Figure 2:
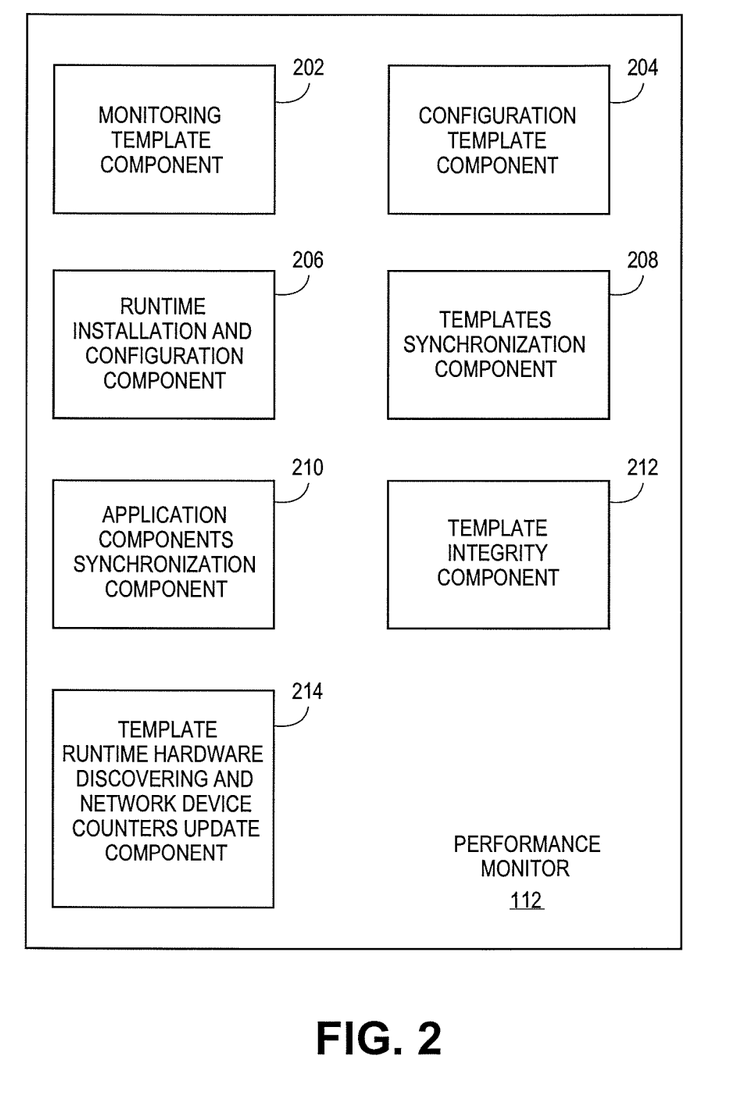
FIG. 2 illustrates a performance monitor according to one embodiment of the invention.

FIG. 2 illustrates a performance monitor 112 according to one embodiment of the invention. In one embodiment, performance monitor 112 includes a number of components 202-214 to perform various functionalities. Monitoring template component 202, as aforementioned, offers the ability to create and run customized monitoring templates to enable the performance monitor 112 to perform monitoring tasks according to the information defined these customized monitoring templates. For example, a monitoring template may be created for a single use and discarded, or saved and used multiple times immediately and/or subsequently. Further, in one embodiment, using monitoring template component 202, one or more customized monitoring templates are created to consolidate any number of existing monitoring tools in any combination, as desired or necessitated, to enable the performance monitor 112 to serve as a universal monitor to simplify the monitoring process and eliminate the need for the user to access and run a large number of individual monitoring tools. Aside from using the existing monitoring tools, monitoring template component 202 provides an additional ability to create and customize one or more monitoring templates to enable the performance monitor to serve a brand new monitoring tool to perform new or those system monitoring tasks for which a monitoring tool is not available at the machine.

Monitoring template component 202 provides the ability to create, run, use, and store monitoring use-case (through its monitoring templates) to include and mix and match any existing or new monitoring activities. Continuing with the Windows and Linux example, monitoring template component 202 enables its monitoring templates to be compatible with, for example, both Linux and Windows operating systems so that their system activities can be seamlessly monitored according to the rules and requirements of each operating system. Further, monitoring templates may be used to specify a system location (e.g., repository, storage device, display device) where the results of monitoring system activities are forwarded. In one embodiment, each monitoring template includes one or more specific locations for monitoring results of one or more specific system activities or, in another embodiment, a default location is defined within the configuration of performance monitor 112 itself or by a combination thereof.

Configuration template component 204 allows the user to predefine monitoring configuration in each monitoring template for each use-case independently so that each use-case can be executed according to a custom configuration as defined by the user. For example, the user may choose to define a particular configuration (that is compatible with the operating system, such as Linux, Windows) in a monitoring template so that the monitoring template can facilitate the performance monitor 112 to perform its monitoring tasks according to the defined configuration as opposed to a default configuration or a configuration that is the same as another configuration.

Runtime installation and configuration component 206 provides the necessary ability to install and configure remotely any monitoring template utility so that the performance monitor 112 is able to perform new monitoring tasks of one or more monitoring tool that so not exist in operating system. In other words, runtime installation and configuration component 206 helps create and install a new monitoring tool that does not exist on the machine (such as it is not provided by the operating system (e.g., Linux) installed on that machine). Further, the tasks of creating and installing a new monitoring tools may be performed remotely between two or more machines.

Templates synchronization component 208 supports updating and synchronization of any changes made to an existing version of a monitoring template provided by the performance monitor 112. In one embodiment, a storage or repository (e.g., template version repository) and its location (e.g., on a host machine) are defined within, in one embodiment, the configuration of the performance monitor 112 (or, in another embodiment, of each template) such that each time a monitoring template is updated (e.g., another monitoring activity is added to it, monitoring time period is reduced, etc.), the updated monitoring template is saved at the defined repository and, at the time of its use, is synchronized with other machines across the board (e.g., other machines being used by the user). This way, each time a user triggers the use of a monitoring template on a machine (the same machine where previously used or installing and/or using on another machine), the defined repository is accessed for template version verification so that the user gets to load and use the most recent version of the monitoring template.

Application components synchronization component 210 provides updating and synchronization of any configuration changes, version updates, etc., made to the performance monitor 112 itself. A storage or repository (e.g., performance monitor version repository) and its location (e.g., on a host machine) are defined within the configuration of the performance monitor 112. Any updates made to the performance monitor 112 are communicated across the board to each machine that loads or uses the performance monitor 112. It is to be noted that in this case, the update and synchronization refers to the any updates (e.g., adding a new component) made to the performance monitor 112 itself as opposed to its monitoring templates. In other words, machine A and machine B use the same version of performance monitor 112 but each may use an entirely different set of monitoring templates (such as according to their separate monitoring needs). In case of an update to the performance monitor 112, that update is communicated to both machines A and B so each machine can have the most recent version of the performance monitor 112.

Template integrity component 212 relates to integrity and security of monitoring templates. As a monitoring template is created, a hash code for that monitoring template is calculated and saved. When the same monitoring template is loaded to be used, a hash code of the monitoring template is recalculated and compared to the hash code previously calculated and saved. If the two hash codes match, the monitoring template is allowed to be loaded and used. If the two hash codes do not match, the monitoring template is considered corrupt and the user is notified of its corruption.

Template runtime hardware discovering and network device counters update component ("hardware discovery component") 214 automatically detects new hardware setting and enables performance monitor 112 to adjust according to the new or available hardware setting. For example, a monitoring template have embedded in it hardware information regarding a network interface of a first device, but when if it is executed on a second device having a different network interface, hardware discovery component 214 automatically and in runtime searches and investigates the network interface of the second device and, accordingly, adjusts the performance monitor 112 making it compatible with the change. For instance, in case of a Windows-based system, at the time of creating a monitoring template, the installed hardware devices of a first machine where the monitoring template is created (and executed) are known and defined in the monitoring template, but when this monitoring template is installed on a second machine, the new devices of this second machine are not likely to be defined in the monitoring template. In this case, performance monitor 112 may use its hardware discovery component 214 to automatically and in runtime discover the devices of the second system and update the information in the monitoring template without any interruption. In case of network-related devices, hardware discovery component 214 investigates the new devices and updates counter at runtime without interrupting the monitoring use case associated with the monitoring template.

Figure 3:
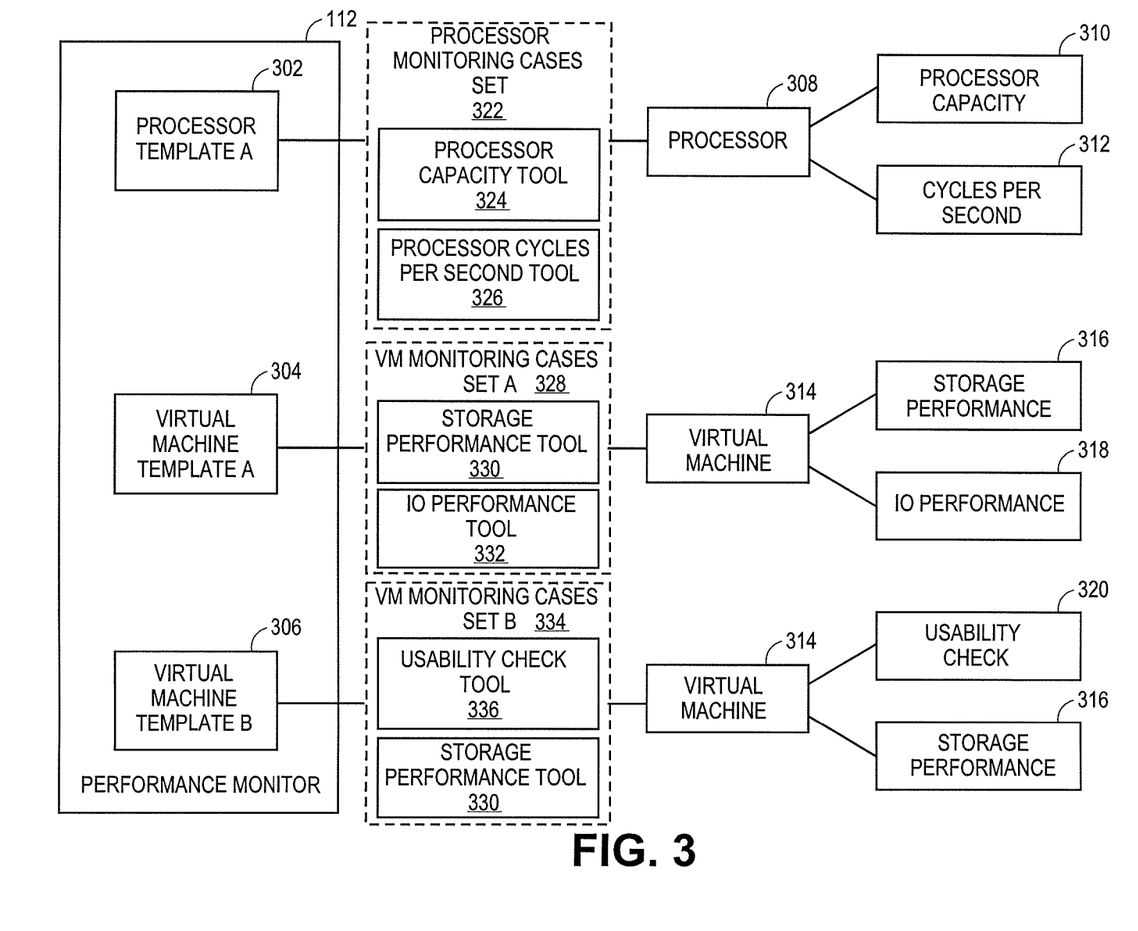
FIG. 3 illustrates monitoring system activities using a performance monitor according to one embodiment of the invention.

FIG. 3 illustrates monitoring system activities using a performance monitor 112 according to one embodiment of the invention. In one embodiment, performance monitor 112 uses a number of monitoring templates 302-306 to serve as a universal monitoring tool or a virtual monitoring tool to consolidate various monitoring tools 324-326, 330-332, 336 are facilitated to perform various monitoring tasks of system activities 310-312, 316-320. In the illustrated embodiment, three monitoring templates, processor template A 302, virtual machine template B 304, and virtual machine template B 306, are created and executed using the performance monitor 112. For simplicity, let us suppose, processor capacity 310 and cycles per second 312 are two different processor activities that are monitored by two separate, but existing, monitoring tools 324, 326. In this case, the user, using processor template A 302, combines or consolidates the two separate monitoring tools, such as processor capacity tool 324 and processor cycles per second tool 326, into a single processor monitoring set, such as processor monitoring cases set 322, to perform monitoring of processor capacity 310 and processor cycles per second 312, relating to processor 308, by facilitating processor capacity tool 324 and processor cycles per second tool 326.

Similarly, using virtual machine template A 304, two monitoring tools, storage performance tool 330 and input/output ("I/O") performance tool 332, are combined or consolidated as virtual machine monitoring cases set A 328 to serves as a monitoring set to monitor system activities of virtual machine storage performance 316 and I/O performance 318 of virtual machine 314. Now, let us suppose, the user wishes to continue to monitor virtual machine storage performance 316 of virtual machine 314, but this time it is to be done while checking the usability 320 of virtual machine 314. For performing these monitoring tasks, the user creates and executes, via performance monitor 112, another monitoring template, such as virtual machine template B 306, to combine storage performance tool 330 and usability check tool 336 to monitor virtual machine storage performance 316 and the virtual machine's 314 usability check 320, respectively.

Stated differently, in one embodiment, using (e.g., by creating and executing) various monitoring templates 302-306, the monitoring capacities of various monitoring tools 324-326, 330-332, 336 is absorbed by consolidating these monitoring tools 324-326, 330-332, 336 in various combinations. For example, as illustrated, a monitoring template 302 is generated to contain the capacity of one or more monitoring tools 324, 326 by consolidating these monitoring tools 324, 326 into a single virtual monitoring tool 322 to perform monitoring tasks (e.g., monitoring system activities 310, 312) of these monitoring tools 324, 326, respectively, using performance monitor 112. These monitoring templates 302-306 are then executed to have performance monitor 112 serve or act as a universal or virtual monitoring tool, through consolidated monitoring tools 322, 328, 334, to facilitate the various monitoring tools 324-326, 330-332, 336 to perform their corresponding monitoring tasks 310-312, 316-318, 320.

Figure 4:
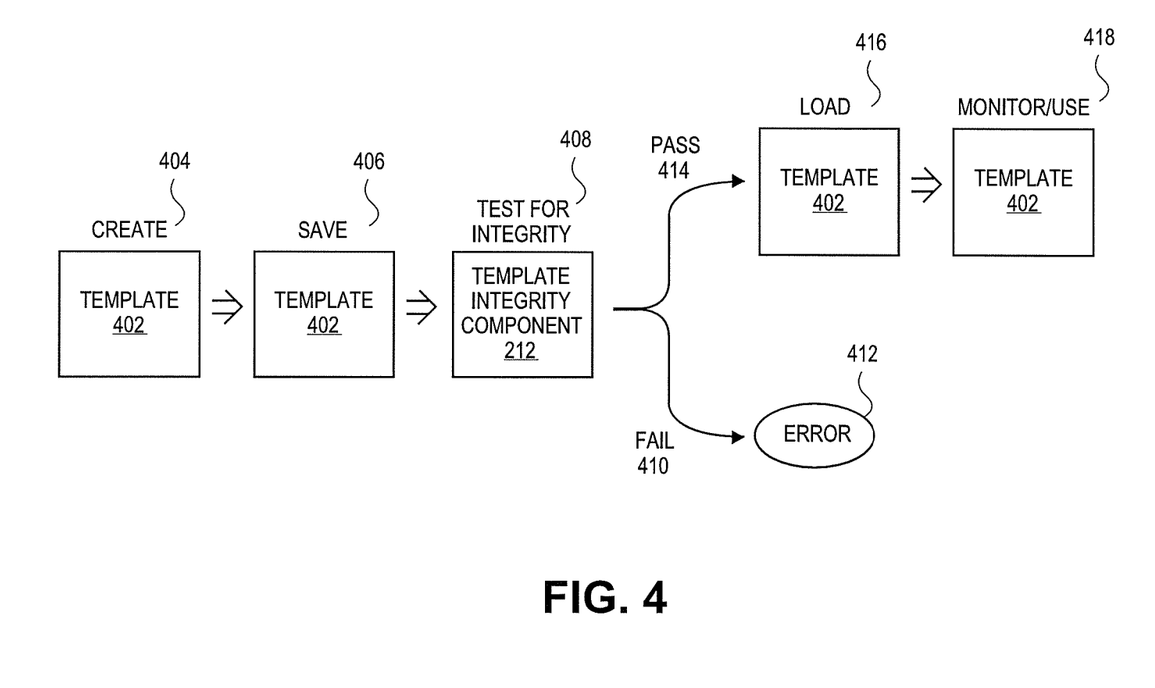
FIG. 4 illustrates a mechanism for performing verification of template integrity of a monitoring template using template integrity component according to one embodiment of the invention.

FIG. 4 illustrates a mechanism for performing verification of template integrity of a monitoring template using template integrity component according to one embodiment of the invention. In one embodiment, a monitoring template 402 is created 404 and then saved 406. Prior to loading 416, the monitoring template 402 is tested for integrity 408 using the template integrity component 212 of performance monitor (FIG. 2). One embodiment of integrity testing is further discussed with reference to FIGS. 5A and 5B. If the monitoring template 402 fails 410 the integrity test 408, an error occurs 412 and an exception is thrown. In this case, a user may be informed of the template integrity failure 410 of the monitoring template 402 so that either the corruption of the monitoring template 402 is investigated and resolved or the entire monitoring template 402 deleted and possibly replaced with another one. If, however, the test 408 is successful 414, the monitoring template 402 is allowed to be loaded 416 and used 418 for performing its assigned tasks of monitoring system activities.

Figure 5A:
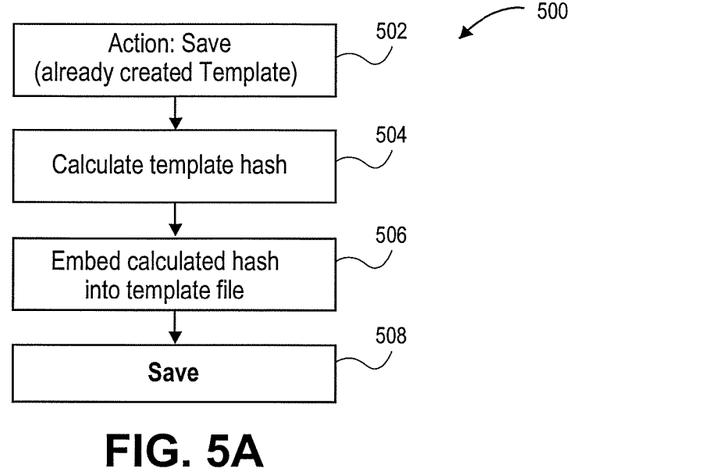
FIGS. 5A and 5B illustrate a method for performing verification of template integrity of monitoring templates using template integrity component according to one embodiment of the invention.
Figure 5B:
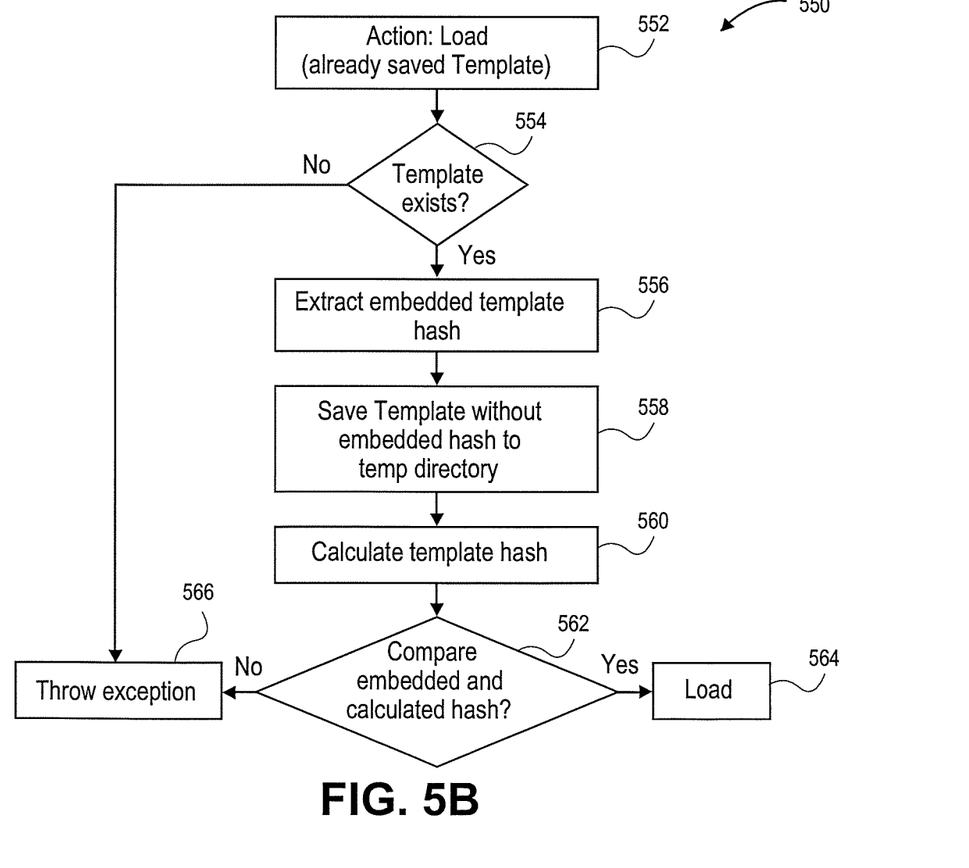

FIGS. 5A and 5B illustrate a method for performing verification of template integrity of monitoring templates using template integrity component according to one embodiment of the invention. Methods 500 and 550 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, methods 500 and 550 are performed by template integrity component of FIG. 2.

With reference to FIG. 5A, in one embodiment, at block 502 the action to save an already-created monitoring template is commenced by calculating a template hash code (e.g., MD5 hash) of the monitoring template at block 504. A hash refers to a hash function, such as a mathematical function to translate large/varying amounts of data into a small datum or even a single integer to serve as an index. Hash values or hash code refer to the values returned by a hash function. The calculated template hash code is then embedded into the monitoring template file at block 506. The monitoring template is saved at block 508.

Now referring to FIG. 5B, at block 552, the action to load the previously saved monitoring template commences with a determination as to whether the monitoring template exits at block 554. If, for any reason, the monitoring template does not exist, the process ends at block 566 with a thrown exception. If, however, the monitoring template exists, the previously-calculated embedded template hash code is now extracted from the monitoring template at block 556. At block 558, the monitoring template is re-saved to a temporary directory but without the embedded template hash code (which was extracted from the monitoring template at block 556). With the previously-calculated template hash code removed, another template hash code is calculated for the monitoring template at block 560. At block 562, the newly-calculated template hash code is compared with the previously-calculated template hash code (that was extracted from the monitoring template). Given no changes were made to the monitoring template, the comparison of the two calculated template hash codes should be an accurate match and if it is, the monitoring template regarded safe and is loaded at block 564. The comparison match verifies that the integrity of the monitoring template is secure and thus, the monitoring template is allowed to be loaded and used for performing its monitoring tasks. If, however, the two calculated hash codes do not match, the monitoring template is regarded as corrupt and in that case, an exception is thrown at block 566. Further, the user may be informed of the integrity breach so that a proper solution can be obtained, such as fixing the corrupt monitoring template, deleting the corrupt monitoring template in favor of a new one, etc.

Figure 6:
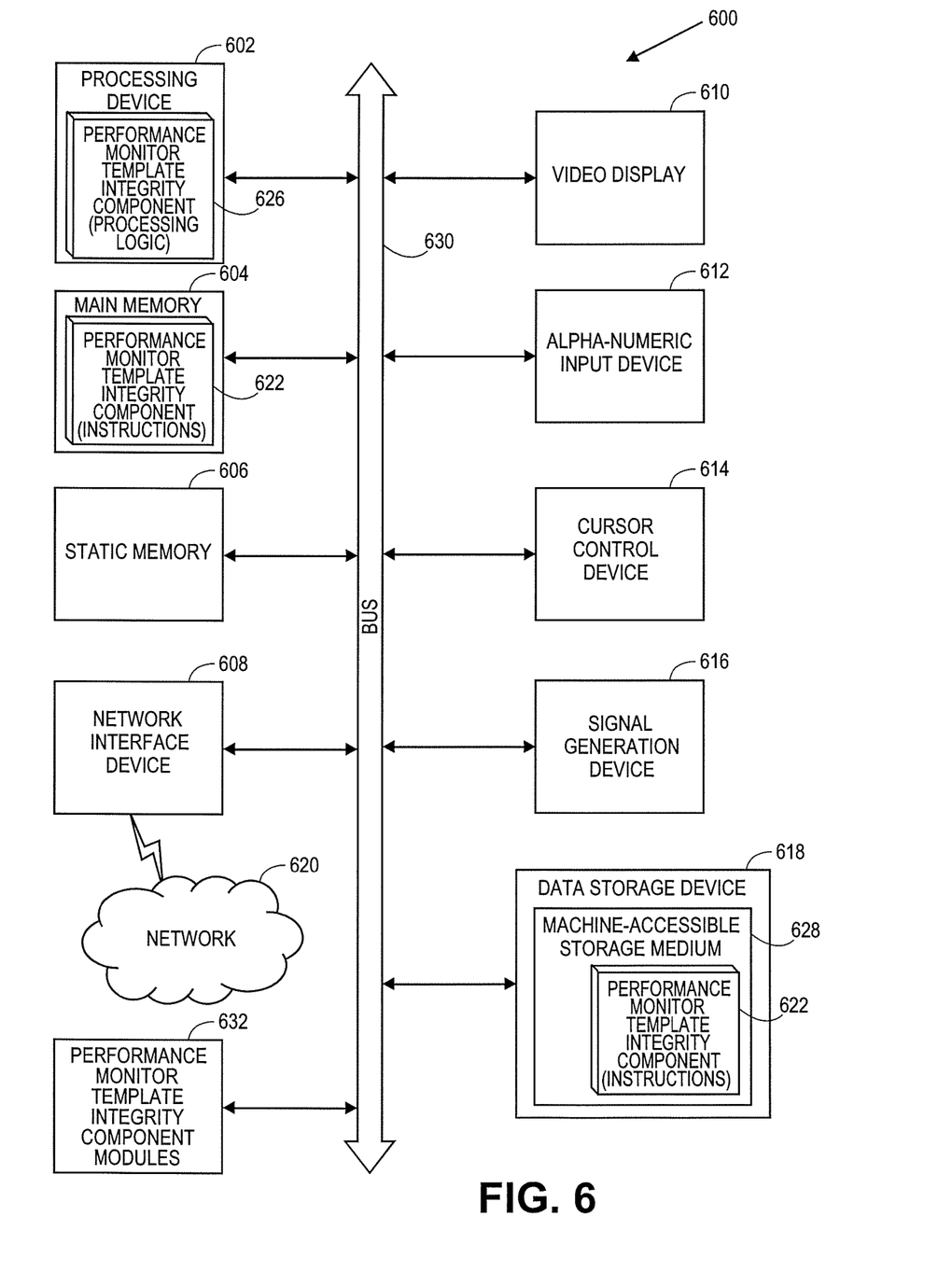
FIG. 6 is a block diagram illustrating one embodiment of a computer system.

FIG. 6 illustrates a computer system 600 for performing verification of template integrity of monitoring templates using template integrity component of a performance monitor. Within the computer system 600 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, random access memory (RAM), dynamic RAM (DRAM) such as synchronous DRAM (SDRAM), DRAM (RDRAM), etc.), a static memory 606 (e.g., flash memory, static random access memory (SRAM), etc.), and a secondary memory 618 (e.g., a data storage device in the form of a drive unit, which may include fixed or removable machine-accessible or computer-readable storage medium), which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic 626 for performing the operations and methods discussed herein.

The computer system 600 may further include a network interface device 608. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 616 (e.g., a speaker).

The data storage device 618 may include a machine-accessible storage medium (or a computer-readable storage medium) 628 on which is stored one or more sets of instructions 622 (e.g., template integrity component) embodying any one or more of the methodologies or functions described herein. The template integrity component may also reside, completely or at least partially, within the main memory 604 (e.g., template integrity component (instructions) 622) and/or within the processing device 602 (e.g., template integrity component (processing logic) 626) during execution thereof by the computer system 600, the main memory 604 and the processing device 602 also constituting machine-readable storage media. Further, for example, the template integrity component instructions 622 may be transmitted or received over a network 620 via the network interface device 608.

The machine-readable storage medium 628 may also be used to store the template integrity component (instructions) 622 persistently. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Template integrity component modules 632, components and other features described herein (for example in relation to FIG. 1) can be implemented as discrete hardware components or integrated in the functionality of hardware components such as ASICS, FPGAs, DSPs or similar devices. In addition, the modules 632 can be implemented as firmware or functional circuitry within hardware devices. Further, the modules 632 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "verifying", "calculating", "extracting", "embedding", "creating", "saving", "storing", "executing", "loading", "monitoring", "throwing", "returning", "enabling", "determining", "detecting", "performing", "facilitating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
calculating a first hash code for a monitoring template, the monitoring template to customize a performance monitor to serve as a universal monitor to perform monitoring of activities of a plurality of system components of the computer system, the universal monitor to replace a plurality of monitoring tools;
embedding the first hash code into the monitoring template;
receiving a request to load the monitoring template;
extracting the first hash code from the monitoring template;
saving the monitoring template to a temporary directory without the first hash code;
calculating a second hash code for the monitoring template with the first hash code removed;
verifying, by a processing device, an integrity of the monitoring template by comparing the first hash code with the second hash code, wherein the integrity of the monitoring template is determined to be satisfactory in response to the first hash code matching the second hash code; and loading the monitoring template from the temporary directory.

2. The method of claim 1, wherein the integrity of the monitoring template is determined to be unsatisfactory if the first hash code does not match the second hash code.

3. The method of claim 1, wherein integrity verification is performed prior to loading the monitoring template, and wherein the monitoring template is loaded for use in monitoring the activities if the integrity is determined to be satisfactory.

4. The method of claim 2, further comprising generating an exception error if the integrity of the monitoring template is determined to be unsatisfactory.

5. The method of claim 1, wherein the first hash code is calculated prior to saving the monitoring template.

6. The method of claim 1, further comprising embedding the first hash code into the monitoring template, and saving the monitoring template with the embedded first hash code prior to extracting the first hash code from the monitoring template.

7. A system comprising:
  a memory to store an operating system and a performance monitor comprising a template integrity component; and
  a processing device coupled to the memory to execute the performance monitor, the processing device to:
    calculate a first hash code for a monitoring template, the monitoring template to customize a performance monitor to serve as a universal monitor to perform monitoring of activities of a plurality of system components of the computer system, the universal monitor to replace a plurality of monitoring tools;
    embed the first hash code into the monitoring template;
    receive a request to load the monitoring template;
    extract the first hash code from the monitoring template,
    save the monitoring template to a temporary directory without the first hash code,
    calculate a second hash code for the monitoring template with the first hash code removed,
    verify an integrity of the monitoring template by comparing the first hash code with the second hash code, wherein the integrity of the monitoring template is determined to be satisfactory in response to the first hash code matching the second hash code; and
    load the monitoring template from the temporary directory.

8. The system of claim 7, wherein the integrity of the monitoring template is determined to be unsatisfactory if the first hash code does not match the second hash code.

9. The system of claim 7, wherein integrity verification is performed prior to loading the monitoring template, and wherein the monitoring template is loaded for use in monitoring the activities if the integrity is determined to be satisfactory.

10. The system of claim 8, wherein the template integrity component is further operable to generate an exception error if the integrity of the monitoring template is determined to be unsatisfactory.

11. The system of claim 7, wherein the first hash code is calculated prior to saving the monitoring template.

12. The system of claim 7, wherein the template integrity component is further operable to embed the first hash code into the monitoring template, and saving the monitoring template with the embedded first hash code prior to extracting the first hash code from the monitoring template.

13. A non-transitory machine-readable storage medium storing instructions which, when executed, cause a processing device to:
  calculate a first hash code for a monitoring template, the monitoring template to customize a performance monitor to serve as a universal monitor to perform monitoring of activities of a plurality of system components of the computer system, the universal monitor to replace a plurality of monitoring tools;
  embed the first hash code into the monitoring template;
  receive a request to load the monitoring template;
  extract the first hash code from the monitoring template;
  save the monitoring template to a temporary directory without the first hash code;
  calculate a second hash code for the monitoring template with the first hash code removed;
  verify, by the processing device, an integrity of the monitoring template by comparing the first hash code with the second hash code, wherein the integrity of the monitoring template is determined to be satisfactory in response to the first hash code matching the second hash code; and
  load the monitoring template from the temporary directory.

14. The non-transitory machine-readable storage medium of claim 13, wherein the integrity of the monitoring template is determined to be unsatisfactory if the first hash code does not match the second hash code.

15. The non-transitory machine-readable storage medium of claim 13, wherein integrity verification is performed prior to loading the monitoring template, and wherein the monitoring template is loaded for use in monitoring the activities if the integrity is determined to be satisfactory.

16. The non-transitory machine-readable storage medium of claim 14, the instructions further to cause the processing device to generate an exception error if the integrity of the monitoring template is determined to be unsatisfactory.

17. The non-transitory machine-readable storage medium of claim 13, wherein the first hash code is calculated prior to saving the monitoring template.

18. The non-transitory machine-readable storage medium of claim 13, the instructions further to cause the processing device to embed the first hash code into the monitoring template, and saving the monitoring template with the embedded first hash code prior to extracting the first hash code from the monitoring template.

* * * * *